Patented Mar. 24, 1942

2,277,325

UNITED STATES PATENT OFFICE 2,277,325

SULPHONYL HALIDES

Richard Hueter, Haus Waldfrieden, Dessau-Rosslau, Anhalt, Germany, assignor, by mesne assignments, to "Unichem" Chemikalien Handels A.-G., Zurich, Switzerland, a corporation of Switzerland No Drawing. Application April 20, 1939, Serial No. 268,952. In Germany May 5, 1938

3 Claims. (Cl. 260—543)

This invention relates to a new and improved process for preparing sulphonyl halides.

In the past, aliphatic sulfonylhalides have been prepared, for the most part, by reacting the corresponding sulphonic acids or their salts with phosphorus pentachloride and like reagents.

It is an object of the instant invention to provide a simple and commercially feasible process for producing sulphonyl halides which have an aliphatic radical attached to the sulphonic acid radical. Another object of the instant invention is to provide a method for preparing sulphonyl halides from readily available raw materials.

The sulphonyl halides of the instant invention are suitable in many commercial processes. They find wide utility as intermediate products in organic chemical synthesis, especially in the preparation of textile treating agents such as those useful in rendering textiles water-repellent.

According to the present invention we have found that sulphonyl halides can be produced in a new and advantageous manner by reacting halogens with mercaptans or disulfide compounds, in which the mercapto or disulphide group is bound aliphatically, the reaction being carried out in the presence of water. This process is quite simple in commercial operations and it also has the distinct advantage that it permits the use of readily available raw materials. In practice the reaction proceeds smoothly and at a low temperature so that the hydrolytic splitting of inorganic halogen acids is readily avoided even when the raw material is suspended in a large quantity of water.

More particularly the invention provides a new process for producing sulphonic acid chlorides although other halides may be produced by following the same procedure. In carrying out the process according to one embodiment of the invention, the mercaptan or disulphide compound is suspended in water and then treated with a halogen, preferably while stirring and while cooling to prevent hydrolytic splitting off of the inorganic halogen acid.

In accordance with a second embodiment of the invention the mercaptan or disulphide is dissolved in an inert solvent, such as, carbon tetrachloride, methyl alcohol or the like, and the halogen is then introduced into the solution in a saturated stream of steam.

In accordance with a third embodiment of the invention it is neither necessary to use water alone nor an organic solvent alone as the reaction proceeds smoothly in the presence of a mixed solution, such as water and alcohol.

After the reaction is completed the sulphonyl halides may be removed from the reaction solution and purified in accordance with known methods. Among the preferred methods may be mentioned extraction with solvents and subsequent recrystallization or by distillation in a partial vacuum.

A wide variety of mercaptans and disulphides can be used in the practice of the invention provided that an aliphatic radical is joined to the disulphide or mercapto radical. Mercapto and disulphide compounds with aliphatic radicals so bound are known and are readily obtainable. These compounds may belong to the aliphatic, aromatic-aliphatic, cycloaliphatic-aliphatic, and the hetero-cyclic-aliphatic series. The hydrocarbon groups of the mercaptans and disulphides may contain, in addition to the hydrocarbon radical, other hetero atoms or hetero atomic groups such as oxygen, halogen, sulphonyl, carboxyl, ester, acid amide, ether, and like groups. The following compounds are illustrative of those which can be used as raw materials in the processes of the instant invention, namely, dodecyl mercaptan, octadecyl mercaptan, montanyl mercaptan, benzyl mercaptan, furfuryl mercaptan, tetra-hydrofurfuryl mercaptan, di-ethyl ether-$\beta$, $\beta'$-di-mercaptan, $\beta$-acetoxy ethyl mercaptan, di-octyl-di-sulphide, di-cetyl-di-sulphide, di-rincinoleyl-di-sulphide, di-naphthenyl-di-sulphide and the like.

The following examples, in which the parts are expressed in parts by weight, serve to illustrate the process of the instant invention.

*Example 1*

Ten and three tenths parts of dodecyl chloride are treated with 3.6 parts of sodium sulphide (technically, about 60%) and 1 part of sulphur in about 14 parts by weight of a 90% to 95% alcohol solution at a temperature of about 80° to 95° C. The treatment is continued for about one hour, and the materials are finally dried by distilling off the alcohol. The residue is washed with warm water and filtered while warm. About 100 parts of di-dodecyl di-sulphide, having a melting point of 23°, are obtained. The di-dodecyl disulphide is suspended in ten times as much water with the aid of thorough stirring. Five times the calculated molecular weight of chlorine necessary for the reaction is introduced into the aforesaid di-suphide solution over a period of ½ hour, while the solution is being strongly cooled from without, and then the stirring is continued for an additional hour.

The resulting dodecyl sulphonic acid chloride is extracted with ether and purified in the usual manner. After crystallization from the petroleum ether the melting point is 42.8° C.

*Example 2*

Ninety parts of normal butyl mercaptan are dissolved in ten times as much methyl alcohol containing about 10% water. Three times the molecular weight of chlorine theoretically necessary for the reaction is then added while vigorously stirring the solution. During the reaction the solution is strongly cooled to prevent a splitting of the chlorine to form hydrochloric acid. When the reaction solution is poured into ice water, butyl sulphonic acid chloride precipitates therefrom as an oil. The normal butyl sulphonic acid chloride obtained by extraction with petroleum benzine distills in a vacuum at 18 mm. mercury between 73° to 97° C.

*Example 3*

Fourteen parts of 4,4'-di-chlor-di-benzyl disulphide are added while stirring to fifteen times as much methyl alcohol containing about 10% of water. Thereafter chlorine is added to the solution while the temperature is kept at about 10° C. until chlorine is no longer absorbed. The reaction product is poured on ice and the 4-chlorbenzyl sulphonic acid chloride formed by the reaction is filtered off, and then recrystallized from ether if so desired. After crystallization the product melts at 85.5° C.

It is to be understood that the instant invention is not limited to the particular examples, compounds, and reactive conditions described herein but that it also includes other equivalent compounds, compositions, and reactive conditions as restricted only by the requirements of the appended claims.

I claim:

1. The process of producing sulphonyl halides which comprises reacting a halogen with an aliphatic disulphide in the presence of water while maintaining a temperature sufficiently low to prevent hydrolytic splitting of the inorganic halogen acid.

2. The process of producing a sulphonyl halide which comprises subjecting an aliphatically bound disulphide to the action of a halogen in the presence of water while cooling the reaction mass to maintain a temperature which produces said halide.

3. The process of producing aliphatic sulphonyl halides which comprises condensing an aliphatic disulphide dissolved in a solvent of said disulphide with chlorine in the presence of water while maintaining a temperature sufficiently low to prevent hydrolytic splitting of the inorganic halogen acid.

RICHARD HUETER.